(12) United States Patent
Marley et al.

(10) Patent No.: US 11,925,204 B2
(45) Date of Patent: Mar. 12, 2024

(54) DOUBLE SIDED ASHTRAY

(71) Applicant: B/E AEROSPACE, INC., Winston Salem, NC (US)

(72) Inventors: Scott Marley, Edmonds, WA (US); Oscar Ruiz Lara, Kirkland, WA (US); Travis John Vaninetti, Bothell, WA (US); Charles F. Forster, Arlington, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 17/834,707

(22) Filed: Jun. 7, 2022

(65) Prior Publication Data
US 2023/0389602 A1 Dec. 7, 2023

(51) Int. Cl.
| | | |
|---|---|---|
| A24F 19/10 | (2006.01) | |
| A24F 19/00 | (2006.01) | |
| A24F 19/06 | (2006.01) | |
| B64D 11/02 | (2006.01) | |

(52) U.S. Cl.
CPC .......... *A24F 19/10* (2013.01); *A24F 19/0092* (2013.01); *A24F 19/06* (2013.01); *B64D 11/02* (2013.01)

(58) Field of Classification Search
CPC ....... A24F 19/10; A24F 19/0092; A24F 19/06
See application file for complete search history.

(56) References Cited

U.S. PATENT DOCUMENTS

| | | | |
|---|---|---|---|
| 1,428,686 | A | 9/1922 | Fargo |
| 3,709,427 | A | 1/1973 | McGregor |
| 2016/0083092 | A1 | 3/2016 | Long et al. |

FOREIGN PATENT DOCUMENTS

| | | |
|---|---|---|
| DE | 102019219528 | 6/2021 |
| ES | 2253958 | 6/2006 |

OTHER PUBLICATIONS

Food Pass Through Door, Oct. 18, 2021 [retrieved on Jul. 21, 2023]. Retrieved from the Wayback Machine: < URL: https://www.kryptomax.com/intensive-use-product-categories/access-and-pass-throughs/food-pass-through-door/ (Year: 2021).*
Pass Hopper, May 12, 2006 [retrieved on Jul. 18, 2023]. Retrieved from the Wayback Machine: <URL: http://feelsafer.com/passhopper.html. (Year: 2006).*
European Patent Office, European Search Report dated Oct. 26, 2023 in Application No. 23177393.8.

\* cited by examiner

*Primary Examiner* — Michael J Felton
*Assistant Examiner* — Daniel Edward Vakili
(74) *Attorney, Agent, or Firm* — SNELL & WILMER L.L.P.

(57) ABSTRACT

A lavatory door including an ashtray is disclosed herein. The lavatory door includes a door panel having a first side and an opposing second side and the ashtray disposed within the door panel. The ashtray includes a first outer panel disposed along the first side of the door panel and configured to move away from the door panel, a second outer panel, opposite the first outer panel, disposed along the second side of the door panel and configured to move away from the door panel, and a bottom surface extending from the first outer panel to the second outer panel.

9 Claims, 8 Drawing Sheets

DOUBLE SIDED ASHTRAY

FIELD

The present disclosure generally relates an ashtray and more specifically to a double-sided ashtray.

BACKGROUND

In commercial aviation, airplanes tend to provide ashtrays in the event that a passenger lights a smoking device (e.g., cigarette, cigar, etc.) so the ash can be kept separate from the trash to avoid fires. In the lavatories, the ashtrays are usually installed in the door with separate ashtrays installed for inside the lavatory and outside the lavatory. Generally, both ashtrays are installed in the door of the lavatory, creating two holes in the door of the lavatory. Ashtrays inside the lavatory are often stolen by passengers, which may go unnoticed for some time. Regulations typically require the ashtray and an aircraft may be deemed unfit to fly if the ashtray is not replaced within days. Furthermore, the ashtrays can be expensive to replace with airlines keeping a supply of replacements in multiple locations in the event of theft.

SUMMARY

Disclosed herein is a lavatory door including an ashtray. The lavatory door includes a door panel having a first side and an opposing second side and the ashtray disposed within the door panel. The ashtray includes a first outer panel disposed along the first side of the door panel and configured to move away from the door panel, a second outer panel, opposite the first outer panel, disposed along the second side of the door panel and configured to move away from the door panel, and a bottom surface extending from the first outer panel to the second outer panel.

In various embodiments, the ashtray further includes a portion extending from the bottom surface and away from the ashtray, the portion having a center pivot point and a pin connecting the center pivot point to the door panel, wherein the first outer panel rotates away from the door panel. In various embodiments, the first outer panel rotates away from the door panel when rotated in a first direction and the second outer panel rotates away from the door panel when rotated in a second direction that is opposite the first direction. In various embodiments, the ashtray further includes a channel formed in the portion extending from the bottom surface and a pin extending from the door panel and through the channel, wherein the pin limits a rotation of the first outer panel. In various embodiments, the ashtray further includes a center partition extending upward orthogonally from the bottom surface, the center partition disposed between the first outer panel and the second outer panel and a rotation stop extending downward from the door panel, the rotation stop configured to stop the center partition from rotating. In various embodiments, the ashtray further includes a first cavity formed between the first outer panel and the center partition and a second cavity formed between the second outer panel and the center partition.

In various embodiments, the ashtray further includes a pin connected to the bottom surface and the first outer panel, wherein the first outer panel rotates about the pin. In various embodiments, the ashtray further includes a first side panel connected to a first side of the bottom surface, a second side panel connected to a second opposing side of the bottom surface, and a top panel connected to the first side panel and the second side panel. In various embodiments, the ashtray further includes a first lip extending upward from the top panel and into the door and a second lip extending upward from the top panel and into the door, wherein the first lip is disposed on an opposite end of the top panel from the second lip.

In various embodiments, the ashtray further includes a first side panel connected to a first side of the bottom surface and a second side panel connected to a second side of the bottom surface, the second side being opposite the first side, the first outer panel being connected to the first side panel and the second side panel. In various embodiments, the lavatory door further includes a slide mechanism connected to the first side panel, the slide mechanism configured to allow the first outer panel to slide away from the door panel in a first direction, and the slide mechanism configured to allow the second outer panel to slide away from the door panel in a second direction that is opposite the first direction.

Also disclosed herein is a double-sided ashtray including a bottom panel having a first side and an opposing second side, a first outer panel connected to the first side of the bottom panel, and a second outer panel connected to the second side of the bottom panel, the first outer panel configured to move in a first direction.

In various embodiments, the double-sided ashtray further includes a bottom member extending from the bottom panel and away from the bottom panel and a pivot point disposed in the bottom member, the pivot point configured to rotate the first outer panel in the first direction. In various embodiments, the double-sided ashtray further includes a channel formed in the bottom member and configured to translate as the outer panel rotates and a pin extending through the channel and configured to stop the translation of the channel.

In various embodiments, the double-sided ashtray further includes a center partition extending upward from the bottom panel and parallel to the first outer panel, the center partition disposed between the first outer panel and the second outer panel and a rotation stop configured to engage a top portion of the center partition to stop rotation of the first outer panel.

In various embodiments, the bottom panel has a third side orthogonal to the first side and a fourth side opposite the third side, and the double-sided ashtray further includes a first side panel connected to the third side of the bottom panel, a second side panel connected to the fourth side of the bottom panel, and a top panel connected to the first side panel and the second side panel, the top panel configured to stop movement of the first outer panel and the second outer panel.

In various embodiments, the double-sided ashtray further includes a pin configured to connect the bottom panel and the first outer panel, the pin forming a center of rotation about which the first outer panel rotates away from the top panel. In various embodiments, the pin is a first pin and the double-sided ashtray further includes a second pin configured to connect the bottom panel and the second outer panel, the pin forming a center of rotation about which the second outer panel rotates away from the top panel.

In various embodiments, the bottom panel having a third side orthogonal to the first side and a fourth side opposite the third side and the double-sided ashtray further includes a first side panel connected to the third side of the bottom panel, the first outer panel, and the second outer panel and a second side panel connected to the fourth side of the bottom panel, the first outer panel, and the second outer panel. In various embodiments, the double-sided ashtray further includes a slide connected to the first side panel and configured to allow lateral movement of the first outer panel in the first direction perpendicular to the first outer panel.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
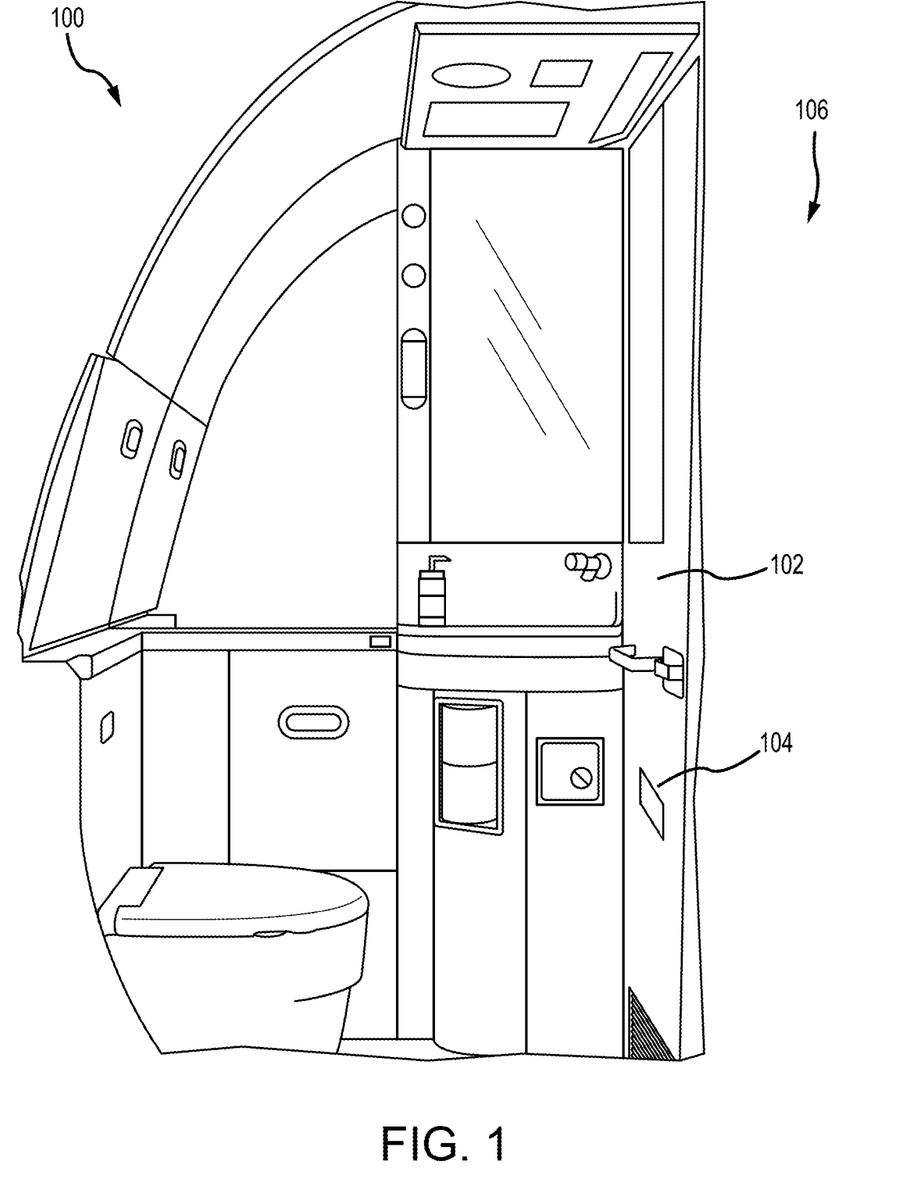
FIG. 1 illustrates an aircraft lavatory, in accordance with various embodiments.

Referring to FIG. 1, in accordance with various embodiments, an aircraft lavatory 100 is illustrated. Aircraft lavatory 100 includes a door 102 and a double-sided ashtray 104 located within door 102 and accessible from either side of door 102. Door 102 separates lavatory 100 from the rest of the aircraft 106. Double-sided ashtray 104 is accessible from either side of door 102 and is therefore more difficult to steal. In various embodiments, double-sided ashtray 104 may be integral with door 102, further reducing the likelihood of theft. Furthermore, double-sided ashtray 104 may reduce the weight of the aircraft, reduce the number of parts for used for a complete installation, reduce the cost of labor for replacing stolen ashtrays, and reduce the number of holes in door 102. Double-sided ashtray 104 provides the same functionality of two ashtrays in current airplanes, thereby reducing the number of parts and weight overall. Double-sided ashtray 104 is more difficult to remove as it is installed through the door, reducing labor costs for replacing an ashtray and decreasing the ease of theft. Furthermore, a single hole in door 102 may be used for installing double-sided ashtray 104. The various embodiments of double-sided ashtray 104 described herein provide privacy within lavatory 100 by blocking the view through the hole of the inside of lavatory 100 from the outside of lavatory 100 (e.g., aircraft 106).

Figure 2A:
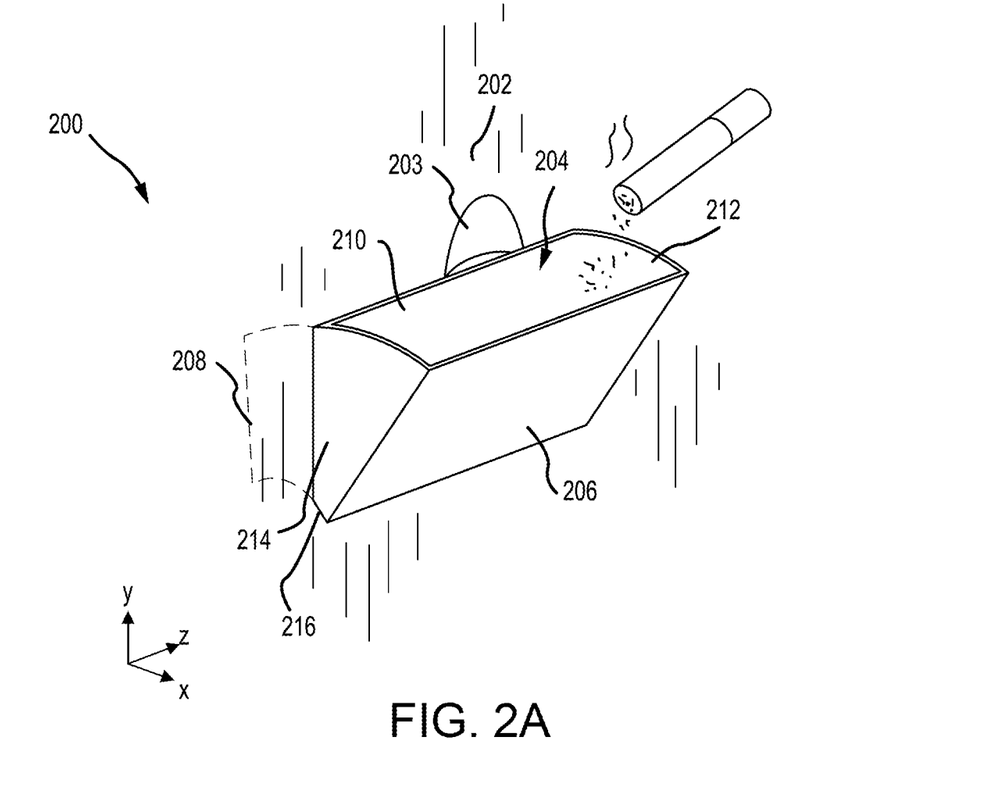
FIGS. 2A, 2B, and 2C illustrate a double-sided ashtray, in accordance with various embodiments.
Figure 2B:
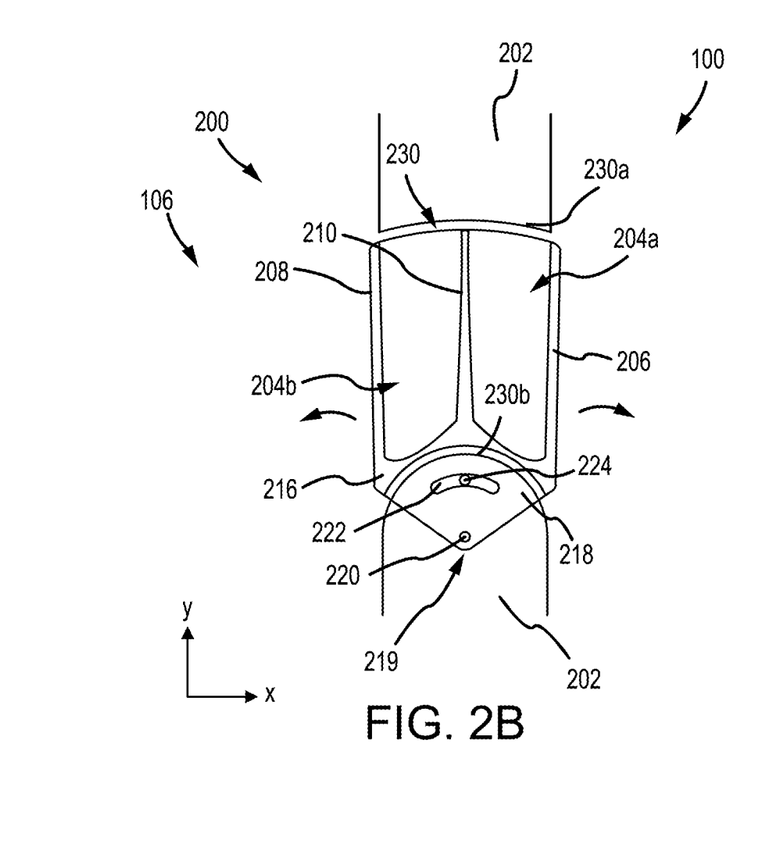
Figure 2C:
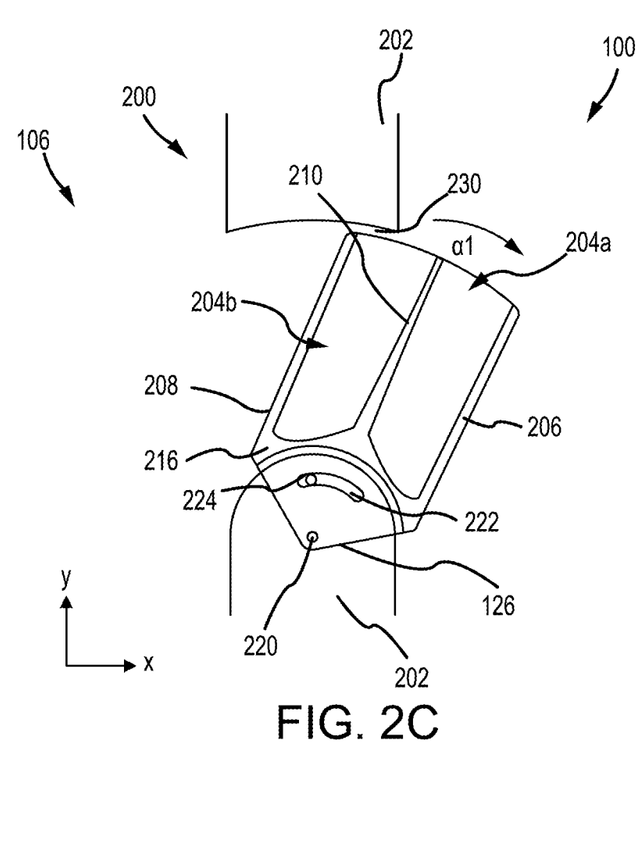

Referring to FIGS. 2A, 2B, and 2C, in accordance with various embodiments, a double-sided ashtray 200 is illustrated. Specifically, FIG. 2A illustrates a perspective view of double-sided ashtray 200 and FIGS. 2B and 2C illustrate a cross-section view of double-sided ashtray 200 in the closed and open position, respectively. Double-sided ashtray 200 is installed in a door 202 with lavatory 100 on one side (e.g., right side as illustrated) and aircraft on the other side (e.g., left side as illustrated). In various embodiments, double-sided ashtray 200 may be installed in a wall, a panel, or a separator, among others. Double-sided ashtray includes a first cavity 204a and a second cavity 204b (collectively referred to as cavities 204). Cavity 204a is defined by inside panel 206, center partition 210, first side panel 212, second side panel 214, and bottom surface 216. Cavity 204b is defined by outside panel 208, center partition 210, first side panel 212, second side panel 214, and bottom surface 216. Inside panel 206, outside panel 208, center partition 210, first side panel 212, and second side panel 214 extend vertically (e.g., y direction) from bottom surface 216 where bottom surface 216 is generally in the x-z plane. In various embodiments, bottom surface 216 is a convex surface, extending in the y direction into cavities 204. In various embodiments, there may be a single cavity 204 with center partition 210 removed. This configuration may still provide the desired privacy within lavatory 100. Door 202 includes an indent 203 configured to allow a passenger to open double-sided ashtray 200, such as with a finger. This allows double-sided ashtray 200 to be flush with the side of door 202 (e.g., inner panel 206 flush with door 202).

Double-sided ashtray 200 is configured to rotate within door 202 and about pin 220. A bottom extension 218 extends from the bottom surface 216 of double-sided ashtray 200. As illustrated, bottom extension 218 is generally triangular, getting narrower further from bottom surface 216. In various embodiments, different shapes for extension 218 are contemplated and allow for rotation of double-sided ashtray 200. Pin 220 is connected to door 202 and through opening 219 in bottom extension 218 and allows double-sided ashtray 200 to rotate inward (e.g., into lavatory 100) and outward (e.g., into aircraft 106). A second pin, pin 224, is connected to door 202 and extends within and through a channel 222 that is formed inside bottom extension 218. Pin 224 slides within channel 222 allowing double-sided ashtray 200 to rotate and stopping the rotation in the open position, on either side of door 202. For example, pin 224 stops the rotation of double-sided ashtray 200 inside lavatory 100, as illustrated in FIG. 2C. double-sided ashtray 200 rotates from upright (e.g., vertical) outward by an angle α1. Angle α1 may be about 0° to about 45°, and more specifically, about 200 to about 35°. The term "about" in this describes means+/−5%.

An opening 230 in door 202 may be formed having a rounded top portion 230a and a rounded bottom portion 230b. The rounded top portion 230a allows double-sided ashtray 200 to rotate from an open position on the aircraft 106 side of door 202, through door 202, and to an open position on the lavatory 100 side of door 202 without disturbing the privacy of the passenger in lavatory 100 or impeding the rotation of double-sided ashtray 200. As illustrated, inside panel 206 and outside panel 208 have a similar height (e.g., a first height in the y-direction) while center partition 210 is slightly taller (e.g., higher than the first height in the y-direction). That is, the tops of inside panel 206 and outside panel 208 extend to the same height in the y-direction while the top of center partition 210 extends to a higher point in the y-direction than the tops of inside panel 206 and outside panel 208. In various embodiments, inside panel 206, outside panel 208, and center partition 210 may all have the same height.

In various embodiments, mechanism may be provided to assist a return to close of double-sided ashtray 200. Some example mechanisms may include a spring, magnet, solenoid, among others. The mechanism may provide sufficient resistance and/or pull to return double-sided ashtray 200 to the closed position. In various embodiments, double-sided ashtray 200 may be weighted such that it naturally returns to center (e.g., closed) when released. For example, a counterweight may be added to bottom extension 218 that biases double-sided ashtray 200 to a closed (e.g., centered) position. In various embodiments, there may be a barb or similar structure configured to holed double-sided ashtray 200 into door 202.

Figure 3A:
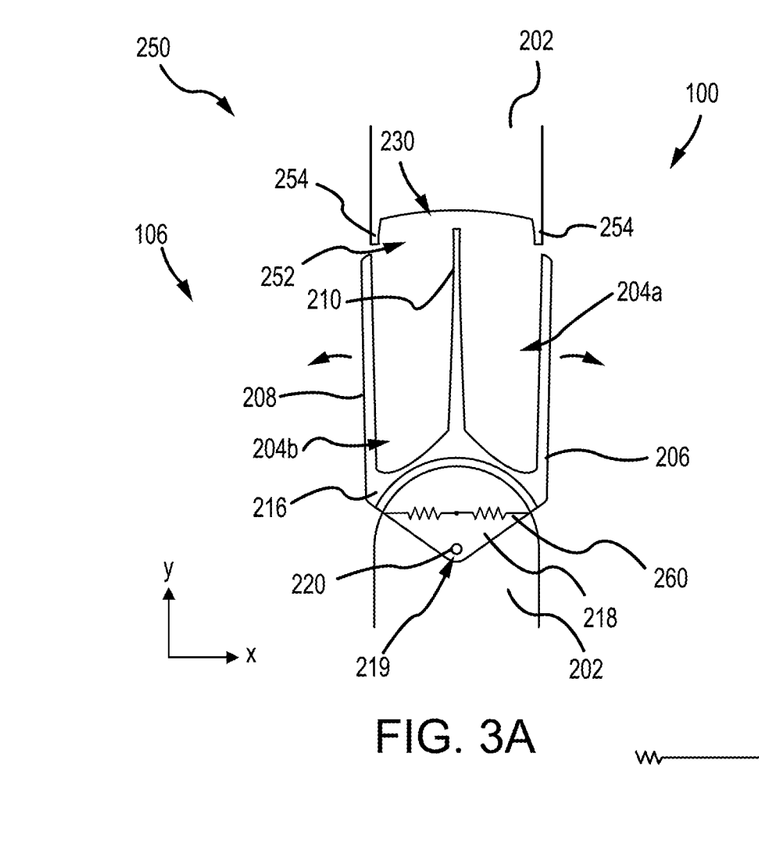
FIGS. 3A and 3B illustrate a double-sided ashtray, in accordance with various embodiments.
Figure 3B:
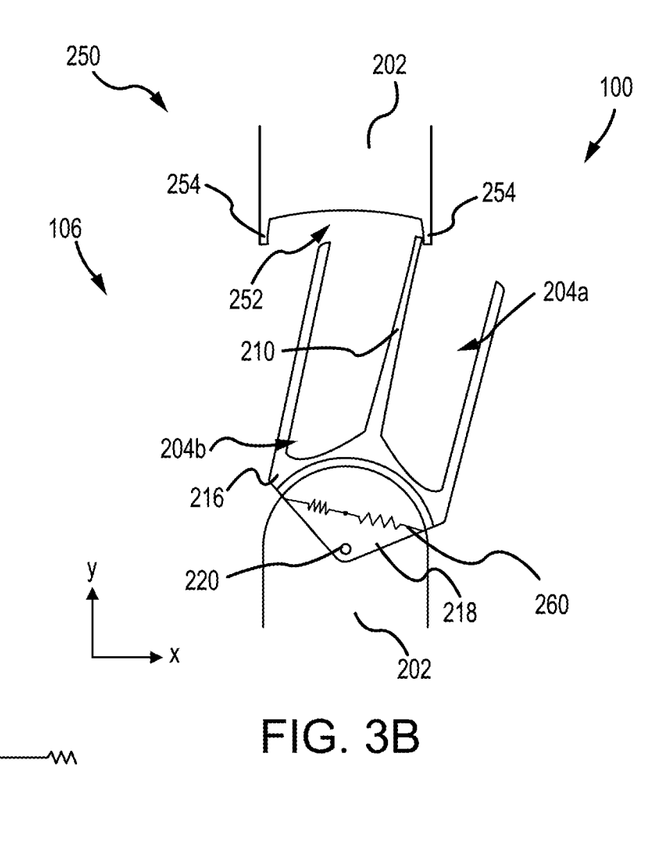

Referring to FIGS. 3A and 3B, in accordance with various embodiments, cross sections of a double-sided ashtray 250 is illustrated. Double-sided ashtray 250 may be an embodiment of double-sided ashtray 200 depicted in FIG. 2A. Several aspects of double-sided ashtray 250 are the same as those described above with respect to double-sided ashtray 200 with except for the differences described below.

Center partition 210 of double-sided ashtray 250 is taller than inside panel 206 and outside panel 208. Door 202 includes opening 230 for receiving double-sided ashtray 250. Opening 230, more specifically door 202, further includes an indentation 252 that extends between rotation stops 254 of door 202. Center partition 210 is configured work within indentation 252. That is, center partition 210 is to move within indentation 252 when double-sided ashtray 250 rotates into lavatory 100 or aircraft 106. The combination of center partition 210 and rotation stops 254 replace channel 222 and pin 224 described above with respect to FIGS. 2B and 2C. Rotation stops 254 block center partition 210 from moving further (i.e., open position), thereby preventing double-sided ashtray 250 from rotating too far (i.e., past open position).

Further, double-sided ashtray 250 may have a mechanism 260 for returning double-sided ashtray 250 to a centered, or closed position. In various embodiments, mechanism 260 may be a spring, solenoid, magnet, among others. As illustrated, mechanism 260 is a pair of springs configured to return double-sided ashtray 250 to the centered, or closed position. In various embodiments, bottom extension 218 may be heavier than the remainder of double sided ash tray 250 such that double-sided ashtray 250 is biased to return to the center, or closed position.

Figure 4A:
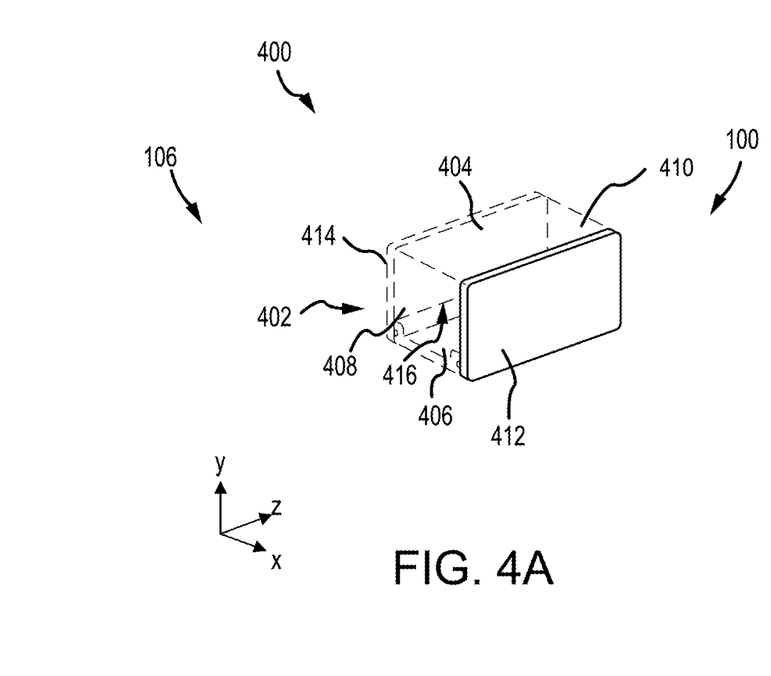
FIGS. 4A, 4B, 4C, and 4D illustrate a double-sided ashtray, in accordance with various embodiments.
Figure 4B:
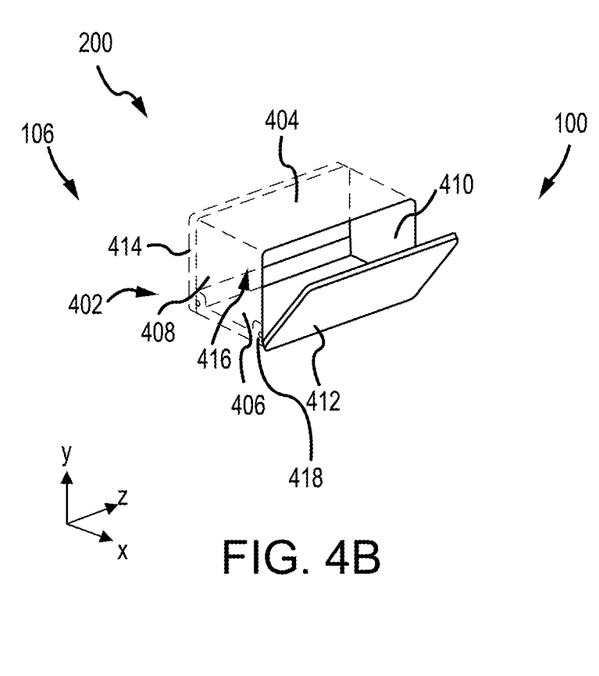
Figure 4C:
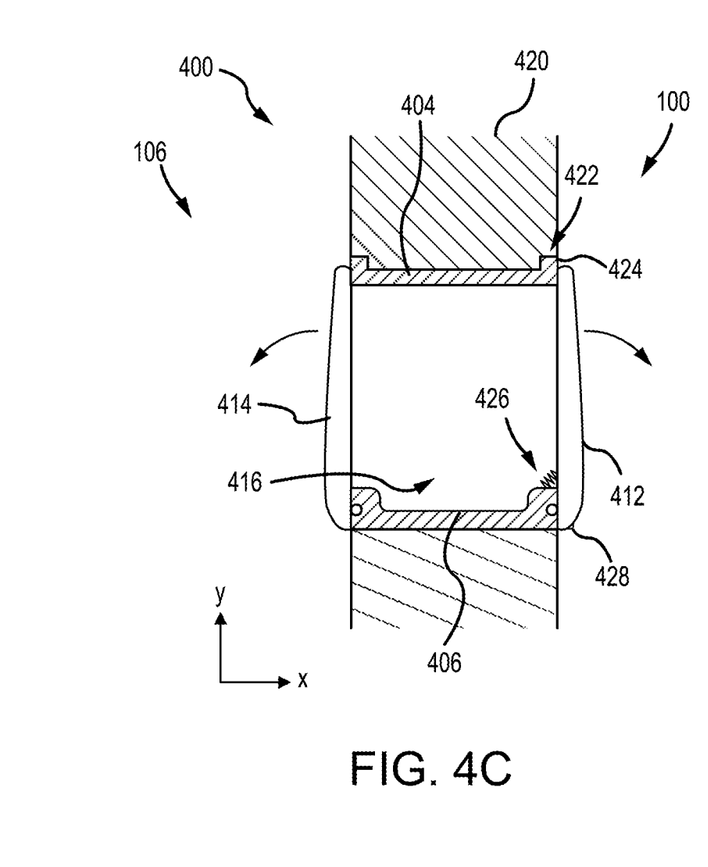
Figure 4D:
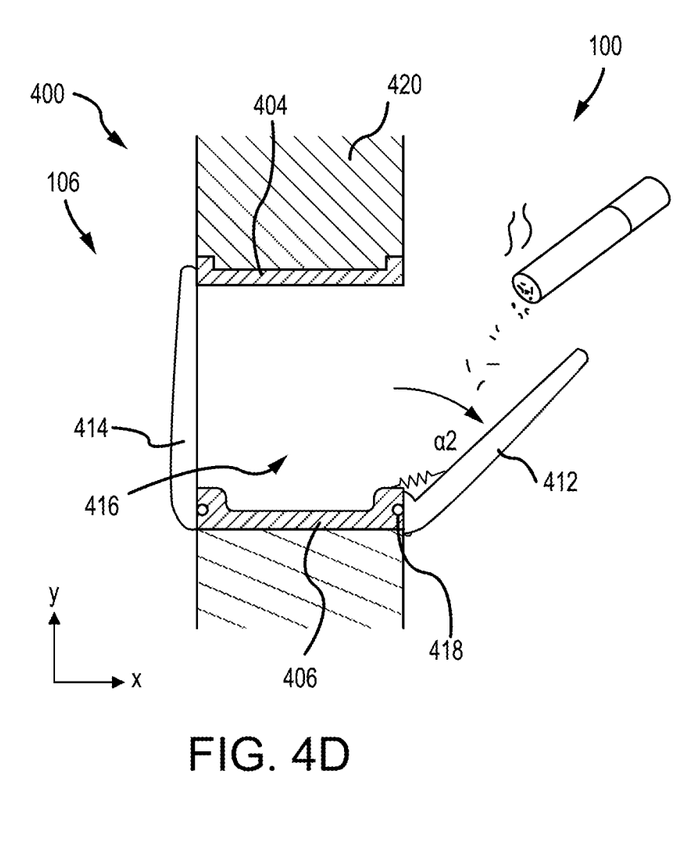

Referring now to FIGS. 4A-4D, in accordance with various embodiments, double-sided ashtray 400 is illustrated. FIGS. 4A and 4B illustrate perspective views of double-sided ashtray 400 in both the closed and open positions, respectively. FIGS. 4C and 4D illustrate cross section views of double-sided ashtray 400 in the closed and open positions, respectively.

Double-sided ashtray 400 comprises a frame 402 including a top 404, a bottom 406, a first side 408, and a second side 410. Double-sided ashtray 400 further includes a first door 412 and a second door 414. As illustrated, first door 412 is configured to open into lavatory 100 and second door 414 is configured open into aircraft 106. Frame 402, first door 412, and second door 414 define a cavity 416 for collecting ashes within double-sided ashtray 400.

A pin 418 connects first door 412 to bottom 406 of frame 402 allowing first door 412 to rotate away from frame 402, thereby opening double-sided ashtray 400. Similarly, a pin 418 connects second door 414 to bottom 406 of frame 402 allowing second door 414 to rotate away from frame 402, thereby opening double-sided ashtray 400. First door 412 and second door 414 are configured to partially open, as illustrated. First door 412 and second door 414 may rotate from an upright position (i.e., vertical) outwardly from door 420 by an angle $\alpha 2$. Angle $\alpha 2$ may be about 0° to about 45°, and more specifically, about 200 to about 35°. The term "about" in this describes means+/−5%. This allows first door 412 and second door 414 to open far enough to use double-sided ashtray 400 but not far enough to see through double-sided ashtray 400. This maintains the privacy of lavatory 100. In various embodiments, a pin, a stopper, spring, or other feature may be implemented on first door 412 and second door 414 to prevent first door 412 and second door 414 from opening past angle $\alpha 2$. For example, a spring 426 is illustrated connected to first door 412 on one end and to bottom 406 on the other end. Spring 426 prevents first door 412 from opening past angle $\alpha 2$ and provides a force to close first door 412. As another example, structure 428 may be formed on first door 412 to prevent first door 412 from opening past $\alpha 2$.

First door 412 and second door 414 may further include a mechanism for returning to the closed position. The mechanism may include a spring, a magnet, or a catch, among others. In various embodiments, first door 412 and second door 414 may further include a side panel extending between the frame 402 and the open first door 412, or second door 414, to prevent ashes or other debris from falling out of double-sided ashtray 400.

Door 420 includes recesses 422 that are configured to receive lips 424 located on the top 404 of frame 402. A first lip 424 is located adjacent the first door 412 and a second lip 424 is located adjacent the second door 414. Recesses 422 and lips 424 are configured to secure double-sided ashtray 400 to door 420 to prevent misuse and/or theft of double-sided ashtray 400.

Figure 5A:
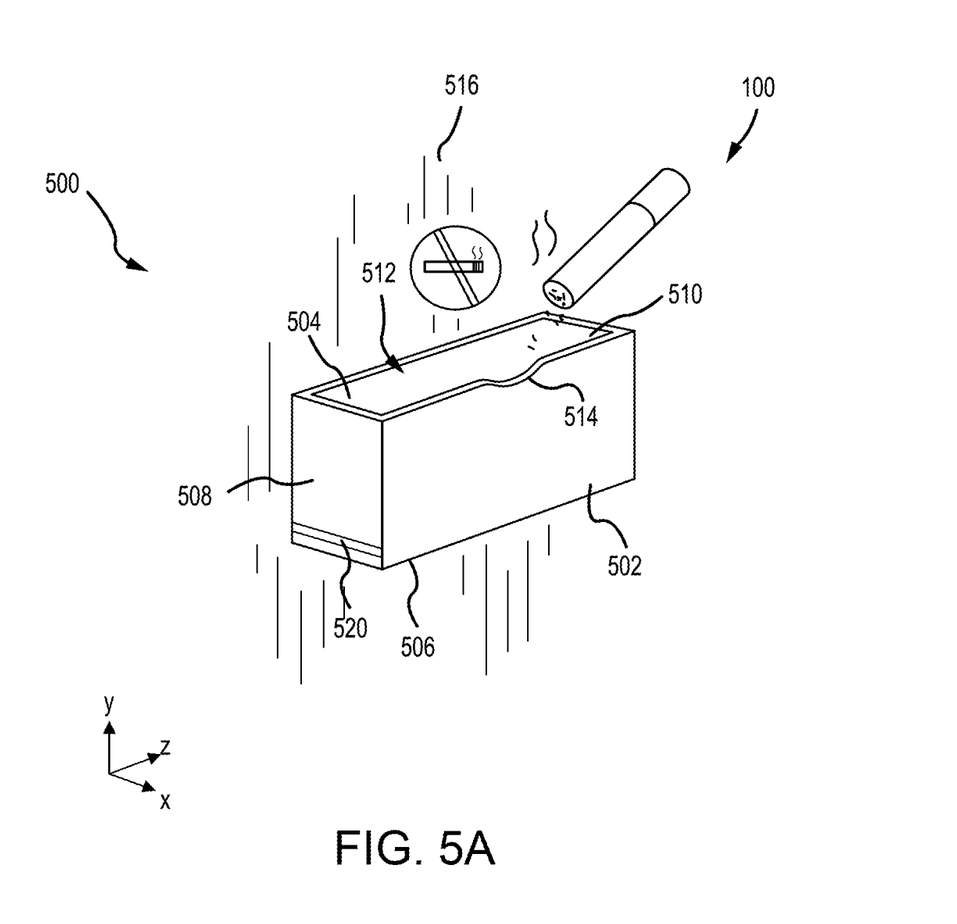
FIGS. 5A, 5B, and 5C illustrate a double-sided ashtray, in accordance with various embodiments.
Figure 5B:
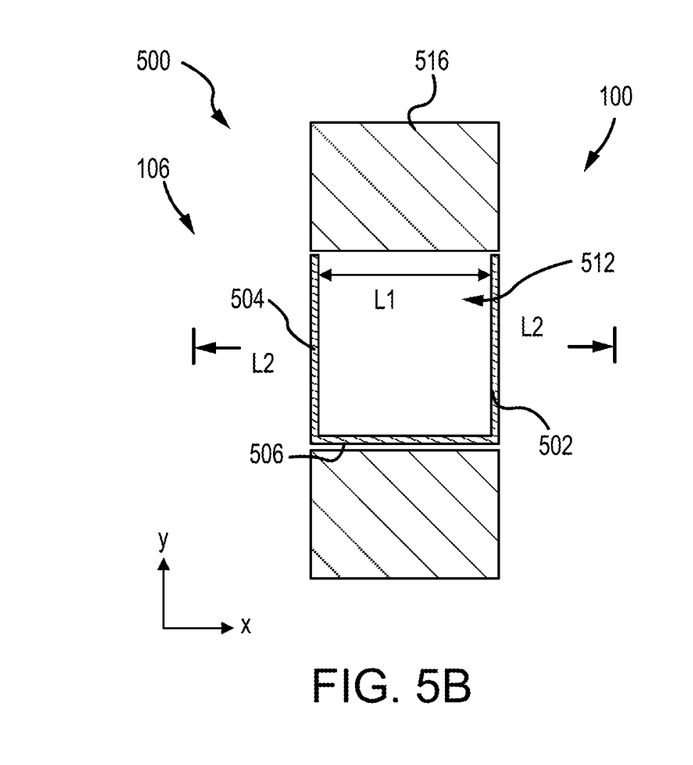
Figure 5C:
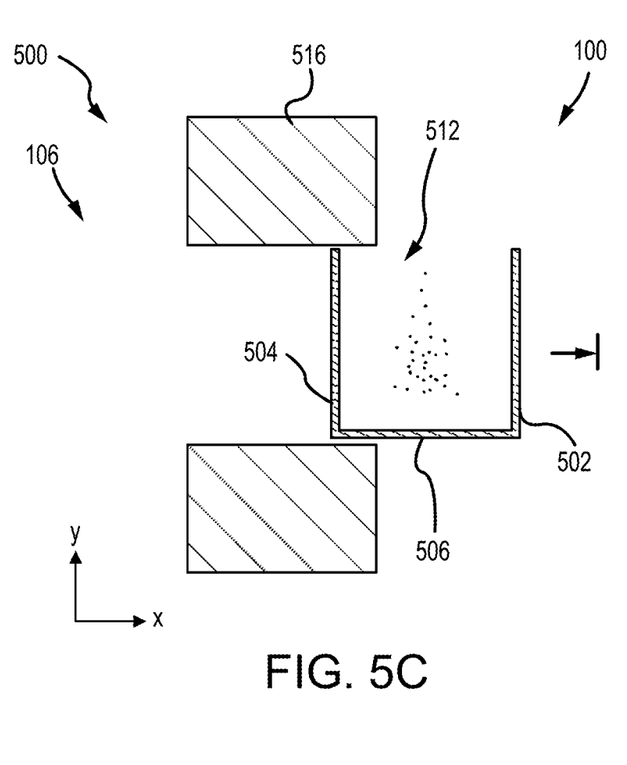

Referring to FIGS. 5A-5C, in accordance with various embodiments, a double-sided ashtray 500 is illustrated. Double-sided ashtray 500 includes a front panel 502, a back panel 504, a bottom panel 506, a first side panel 508, and a second side panel 510 which collectively define a cavity 512. An indent 514 is formed in the front panel 502, along a top surface of the front panel 502. Indent 514 allows a passenger to pull double-side ashtray 500 out from wall 516 for use.

Double-sided ashtray 500 has a distance L1 between front panel 502 and back panel 504 and laterally translates out of wall 516 by a length L2. Length L2 may be about 25% to about 95% of length L1, and more specifically, about 35% to about 75% of length L2. The term "about" means+/−10%. This allows double-sided ashtray 500 to be useable by a passenger without being pulled out of wall 516. Double-sided ashtray 500 may further include a mechanism 520 for returning to a closed position (i.e., within wall 516). For example, a spring, slides, soft close slides, solenoid, or magnets, among others, may be used to control how far double-sided ashtray 500 opens (i.e., translates out of wall 516) and to return to a closed position (i.e., within wall 516). As illustrated, mechanism 520 is a slide for supporting double-sided ashtray 500 when extend from wall 516.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lavatory door including an ashtray, comprising:
   a door panel having a first side and an opposing second side; and
   the ashtray disposed within the door panel, the ashtray including:
      a first outer panel disposed along the first side of the door panel and configured to move away from the door panel;
      a second outer panel, opposite the first outer panel, disposed along the second side of the door panel and configured to move away from the door panel;
      a bottom surface extending from the first outer panel to the second outer panel;
      a portion extending from the bottom surface and away from the ashtray, the portion having a center pivot point; and
      a pin connecting the center pivot point to the door panel, wherein the first outer panel rotates away from the door panel.

2. The lavatory door of claim 1, wherein the first outer panel rotates away from the door panel when rotated in a first direction and the second outer panel rotates away from the door panel when rotated in a second direction that is opposite the first direction.

3. The lavatory door of claim 1, the ashtray further comprising:
   a channel formed in the portion extending from the bottom surface; and
   a second pin extending from the door panel and through the channel, wherein the second pin limits a rotation of the first outer panel.

4. The lavatory door of claim 1, the ashtray further comprising:
   a center partition extending upward orthogonally from the bottom surface, the center partition disposed between the first outer panel and the second outer panel; and
   a rotation stop extending downward from the door panel, the rotation stop configured to stop the center partition from rotating.

5. The lavatory door of claim 4, the ashtray further comprising:
 a first cavity formed between the first outer panel and the center partition; and
 a second cavity formed between the second outer panel and the center partition.

6. A lavatory door including an ashtray, comprising:
 a door panel having a first side and an opposing second side; and
 the ashtray disposed within the door panel, the ashtray including:
  a first outer panel disposed along the first side of the door panel and configured to move away from the door panel;
  a second outer panel, opposite the first outer panel, disposed along the second side of the door panel and configured to move away from the door panel;
  a bottom surface extending from the first outer panel to the second outer panel;
  a first lip extending upward from the top panel and into the door panel; and
  a second lip extending upward from the top panel and into the door panel, wherein the first lip is disposed on an opposite end of the top panel from the second lip.

7. The lavatory door of claim 6, the ashtray further comprising:
 a pin connected to the bottom surface and the first outer panel, wherein the first outer panel rotates about the pin.

8. The lavatory door of claim 7, the ashtray further comprising:
 a first side panel connected to a first side of the bottom surface;
 a second side panel connected to a second opposing side of the bottom surface; and
 a top panel connected to the first side panel and the second side panel.

9. A lavatory door including an ashtray, comprising:
 a door panel having a first side and an opposing second side; and
 the ashtray disposed within the door panel, the ashtray including:
  a first outer panel disposed along the first side of the door panel and configured to move away from the door panel;
  a second outer panel, opposite the first outer panel, disposed along the second side of the door panel and configured to move away from the door panel;
  a bottom surface extending from the first outer panel to the second outer panel;
  a first side panel connected to a first side of the bottom surface;
  a second side panel connected to a second side of the bottom surface, the second side being opposite the first side, the first outer panel being connected to the first side panel and the second side panel; and
  a slide mechanism connected to the first side panel, the slide mechanism configured to allow the first outer panel to slide away from the door panel in a first direction, and the slide mechanism configured to allow the second outer panel to slide away from the door panel in a second direction that is opposite the first direction.

* * * * *